Aug. 6, 1940.   R. SCHMID ET AL   2,210,733
TOOL OPERATING DEVICE AND FLEXIBLE CABLE THEREFOR
Filed April 14, 1937
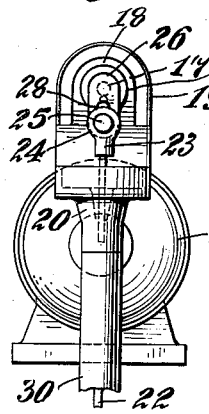
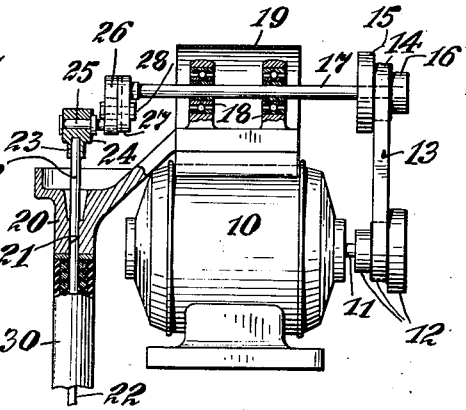
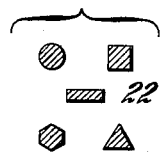
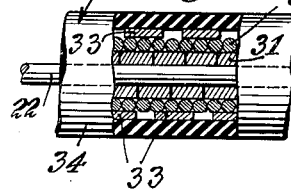
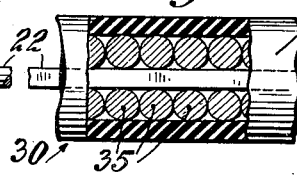
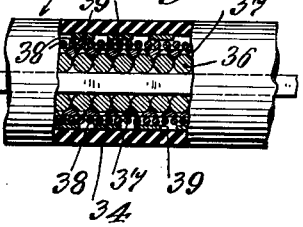
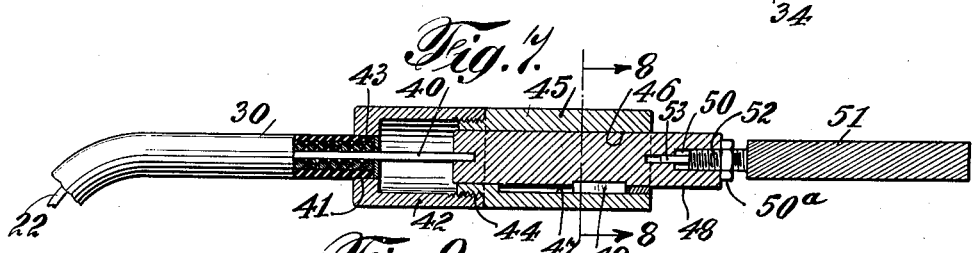
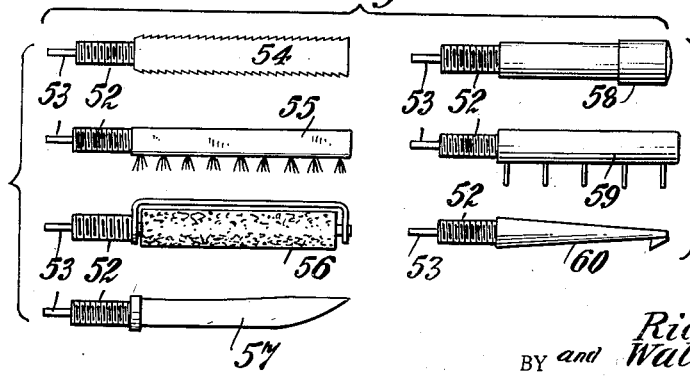
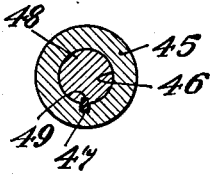
INVENTORS
Richard Schmid
BY and Walter Wezel
their ATTORNEY.

Patented Aug. 6, 1940

2,210,733

UNITED STATES PATENT OFFICE 2,210,733

TOOL OPERATING DEVICE AND FLEXIBLE CABLE THEREFOR

Richard Schmid and Walter Wezel, Maulbronn, Germany, assignors to Schmid & Wezel, Inc., Long Island City, N. Y., a corporation Application April 14, 1937, Serial No. 136,836

4 Claims. (Cl. 74—501)

This invention relates to tool operating devices and flexible cables therefor, and has for its object to provide an improved means whereby in flexible cables the interior operating member, instead of being rotated, is subjected to a reciprocating action. Such action permits the use of tools such as files, saws or the like, which in their use require a to and fro movement instead of a rotary movement.

The object of the invention is further to provide an improved flexible cable.

The object of the invention, finally, is to produce a tool head, a part of which is operated by the reciprocating member of the flexible cable, and which in turn operates the specific tool intended to be used. For this purpose, the invention consists in providing means for reciprocating an interior member of a flexible cable, whereby the interior member is subjected to a reciprocating movement throughout the length of the flexible cable.

Our invention consists further in improvements in the making of a flexible cable so as to give it sufficient strength and resisting powers to enable the interior member to properly reciprocate throughout the length of the cable.

Finally, our invention consists of a tool head which has a stationary casing and a movable member connected in turn with a reciprocating interior member and connected also with the specific tool to be used. Such replaceable tools may be a file, a saw, a brush or similar device, such as are used in the arts and subjected to a to and fro movement.

The invention will be more fully described hereinafter, embodiments thereof will be shown in the drawing, and the invention will be finally pointed out in the claims.

In the accompanying drawing:

Figure 1 shows a side view partly in section of a motor and transmission means arranged to subject the interior member to the flexible cable, which may be a wire or the like, to a to and fro movement;

Figure 2 is a front view of the device shown in Figure 1, showing the eccentric action of the parts which bring about the to and fro movement of the interior member of the cable;

Figure 3 shows cross sections of various forms of the interior member, and at the same time such cross sectional contours used for the surrounding wires forming a metallic casing in which the interior member moves to and fro;

Figure 4 is a side view broken away to show a section of one form of the interior of the flexible cable;

Figure 5 is a similar side view broken away to show a section of another form of flexible cable;

Figure 6 is a similar side view broken away to show still another form of the interior of the flexible cable;

Figure 7 shows a section of the tool head showing its connection with the flexible cable to one end thereof, and showing its connection with a tool on the other end thereof;

Figure 8 is a transverse section taken on line 8—8 of Figure 7; and

Figure 9 shows side views, diametrically, of various forms of tools which are used in the arts.

Similar characters of reference indicate corresponding parts throughout the various views.

Referring to Figures 1 and 2, the motor 10 of known construction has a shaft 11 with pulleys 12 thereon, and over the medium sized pulley a belt 13 passes which in turn passes over the medium sized pulley 14 between the pulleys 15 and 16, which are secured to a shaft 17 extending horizontally through bears 18 of an upward extension plate 19 of the motor 10. These parts are well-known.

The frame of the motor has a downwardly depending member 20 having an interior bore 21 through which passes an interior member or wire 22. The upper end of this wire 22 is secured to a ring 23 having a suitable bearing 24, and the central part of this bearing is a stud shaft 25. This stud shaft 25 is part of or may be secured to an upwardly extending arm 26 suitably secured to a downwardly extending arm 27, the arms 26 and 27 being secured together by a detachable bolt 28. The arm 27 extends downwardly as shown in Figure 1 in the position there shown from the shaft 17. The arrangement of parts just described and as shown also in Figure 2, is that there is an eccentric action between the arms 26 and 27 in that as the arm 27 is rotated by the shaft 17, the ring 23, and in consequence the wire 22, are given an up and down movement. The eccentricity is adjustable as seen from the drawing, and thereby the amplitude of the to and fro movement of the interior member may be varied. This is an important consideration because in the past, attempts to use to and fro moving tools failed due to the lack of means to give such tools the necessary to and fro movement. For instance, if the to and fro movement was too great in amplitude the tools would not work properly, and if too little the tools were ineffective. Various tools require different amplitudes of to and fro movement and this adjustment of the eccentricity provides a means for varying the extent of the to and fro movement. The wire 22 extends from out of the bore 21 downwardly into a cable 30 and along the entire length of this flexible cable 30. The wire 22 may have any suitable contour, for instance, circular, square, rectangular, hexagonal or triangular, as shown in Figure 3. The flexible cable itself is of improved construction, and various embodiments of the same are shown in Figures 4, 5 and 6.

In Figure 4, the interior member or wire 22, which as stated may be of any suitable contour, is arranged centrally and is surrounded by a sleeve 31 which in turn is surrounded by a helically wound wire 32 extending the entire length of the cable, and this helically wound surrounding wire 32 is again surrounded by a flattened wire or of a rectangular shape indicated by 33 also helically wound the length of the cable. The wire 32 may either be so arranged as to have its coils contiguous to each other or slightly spaced from each other. The flattened wire 33 has its coils preferably spaced from each other. Around these wires a case of suitable water-proofing material or the like and having a suitable flexibility, and indicated by 34, is provided. This may be rubber or the like with or without a canvas inlay, or a canvas covering.

The cable described permits the interior member or wire 22 to move to and fro therein, and at the same time affords sufficient flexibility to permit the uses to which a flexible cable is put, and mainly it provides a sufficient rigidity longitudinally of the cable which acts in substance as a rigid casing so as to insure the to and fro movement of the interior member 22.

In Figure 5 another embodiment of the invention of the flexible cable is shown. Here again the interior member or wire 22 may be of any suitable contour, and this is surrounded by a circular wire helically wound around the same indicated by 35 and having a larger diameter than the wire 32 in Figure 4. The coils of the wire 35 may be either contiguous to each other or slightly spaced from each other. The coils of the wire 35 may be either round in cross section or given any other shape shown in Figure 3. Similarly, the coils 32 in Figure 4 may have any of the shapes of Figure 3. The winding 35 in turn is surrounded by a rubber casing 34 with or without canvas. In Figure 6 the preferred form of cable is shown. Here, the cable 30 has the interior wire 22 of any suitable contour. It is surrounded by a helical wire sleeve 36 now having a diameter somewhat similar to the wire sleeve 35 of Figure 5, and this sleeve 36 is surrounded by a sleeve of triangular shaped wire 37, a cross section of the wire being as shown in the triangular wire of Figure 3. The apexes of this triangular wire are directed toward the center of the cable and enter the bites of the coils of the wire 36. This sleeve of triangular wire is surrounded by a sleeve of circular wire 38, and this in turn by another sleeve of flattened or rectangularly shaped wire 39. The coils of the wire 36 may be either contiguous or slightly spaced from each other, and similarly with the wire 37 as also the wires 38 and 39. In each of the embodiments Figures 4, 5 and 6, the particular shape shown may be substituted by any suitable cross section of wire such as shown in Figure 3. Finally, this sleeve of wire is surrounded by the lower layer or casing 34 with or without canvas.

From the description of the embodiments shown in Figures 4, 5 and 6, it is seen that a longitudinally rigid yet a flexible cable is provided which has a suitable guiding means for the to and fro movement of the interior wire 22. At the free end of this flexible cable the wire 22 protrudes from the cable as shown by the part 40 in Figure 7. The end of the cable 30 is secured to one end of a tool head, this end having a bore 41 of a casing 42 into which the free end 43 of the cable 30 is suitably secured. This casing member 42 has an interior screw thread 44 to which the other part of the casing 45 having a corresponding screw thread, is secured. This part 45 of the casing is provided with an interior bore 46 extending the length thereof, and this bore 46 has an additional recess 47. Within the bore 46 is a cylindrical member 48 having a fin 49 adapted to be engaged in the recess 47 of the bore 46. Instead of using a cylindrical member 48, a square shape or other cross section may be used for the member 48 and cooperating with a similarly shaped bore, in which case, of course, the fin 49 and recess 47 may be dispensed with. The member 48 extends outside of the casing 45 and is provided with a recess interiorly screw threaded, as shown by 50, said recess having a suitable contour to adapt itself to the holding ends of tools. For instance, in the tools shown in Figure 9, each tool 51 has a screw threaded sub-calibre stem 52 and a sub-calibre extension 53, and the recess having the screw threads 50 would be adapted to the known uses and configurations of the holding parts of the tools as used.

In Figure 7 the tool 51 there shown is an ordinary file which for its operation in the commercial arts requires a to and fro movement held in position by a lock nut 50a.

In Figure 9 the first embodiment shows a special form of file 54, a metallic brush 55, a polishing roller 56, a knife 57, a smoother 58, a corrugator 59, and finally the hook shaped tool 60 which enables grooves to be made in work pieces under a to and fro movement. These forms of tools are well known and one can be replaced by the other depending upon the particular job to be carried out.

From the foregoing it will be seen that the improvement consists in subjecting the interior member of a flexible cable to a to and fro movement instead of to a rotary movement, and that an improved casing for such to and fro moving interior member has been provided which gives sufficient flexibility and still such rigidity as to permit the free movement of the to and fro moving member, parts of the flexible cable acting in the nature of anti-friction devices for the to and fro movement. And finally an improved tool head is provided which enables on the one hand the substitution of various forms of tools, and on the other hand it is readily connected with the flexible cable so as to subject such tools to a to and fro movement.

A special feature of the movable parts is that the interior member, with very little play, is journalled in the very strongly built casing of the hose or flexible cable, and is subjected to not alone tension and compression, but to pressure whereby the movements of the tools themselves are controlled and governed in a to and fro movement. The interior member is therefore not one that has only to draw in one direction.

The sleeves of the casing of the flexible cable have the necessary fixity against extension or shortening while the work is being carried out, as is seen from the character of the construction of the flexible cable. The sleeve wires are preferably of steel to resist the necessary strains and stresses. Finally, the rubber casing may be covered with iron or steel wire as a further protection against injury to the rubber, this final sleeve not being shown, as it is well-known. The rubber may be either vulcanized or not, as is well known.

The motor shown is one which is capable of being operated at different speeds, and this variation of speed of the motor, combined with the adjustable eccentric action upon the interior member through its stable hose or casing, gives to the free end of the interior member where it is connected with the tool holder, a straight to and fro movement, and, in consequence, gives the tools which may be fixed to a very simple tool holder, a straight to and fro movement. The various wire sleeves as described prevent the cable from being pressed together along its length.

We have shown various embodiments of our invention, but we do not wish to be limited thereto, as changes may be made therein without departing from the spirit of the invention as defined in the appended claims.

We claim:

1. In a tool operating device consisting of a flexible cable having an interior longitudinally rigid member but flexible transversely, and a ring at the end of said interior member, the combination therewith of a rotary shaft, means for operating the shaft, an eccentric connection between said rotary shaft and said ring-shaped member, whereby the interior member is subjected to a to and fro movement, and means for varying said eccentric connection for varying the amplitude of the to-and-fro movement.

2. A flexible cable having a longitudinally rigid and transversely flexible interior member adapted for to and fro movement, a sleeve of round wire surrounding the same, a sleeve of triangular wire surrounding the first sleeve, the apexes of the triangular wire entering into the bite of the first circular wire sleeve, a third sleeve of circular wire, a fourth sleeve of rectangular shaped wire, and a fifth sleeve of rubber or the like, permitting a longitudinal to-and-fro movement of the interior member within said wire sleeves, whereby a flexible casing is provided having rigidity in the longitudinal direction and flexibility transversely thereof to permit to and fro movement of the interior member.

3. A flexible cable having a longitudinally rigid and transversely flexible interior member adapted for to-and-fro movement, a sleeve of rectangular shaped wire surrounding same, a sleeve of round wire surrounding the first sleeve, a third sleeve of rectangular wire, and a fourth sleeve of rubber or the like, permitting a longitudinal to-and-fro movement of the interior member within said wire sleeves, whereby a flexible casing is provided having rigidity in the longitudinal direction and flexibility transversely thereof to permit to-and-fro movement of the interior member.

4. A flexible cable having a longitudinally rigid and transversely flexible interior member adapted for to-and-fro movement, a sleeve of rectangular shaped wire surrounding same, a sleeve of round wire surrounding the first sleeve, a third sleeve of rectangular wire, said third sleeve having its coils spaced apart from each other, and a fourth sleeve of rubber or the like, permitting a longitudinal to-and-fro movement of the interior member within said wire sleeves, whereby a flexible casing is provided having rigidity in the longitudinal direction and flexibility transversely thereof to permit to-and-fro movement of the interior member.

RICHARD SCHMID.
WALTER WEZEL.